(12) United States Patent
Rijsbergen et al.

(10) Patent No.: US 7,014,254 B2
(45) Date of Patent: Mar. 21, 2006

(54) FASTENING DEVICE FOR A COMPONENT INSTALLED IN A DEPRESSION IN AN AUTOMOTIVE BODY PART

(75) Inventors: Markus Rijsbergen, Leonberg (DE); Holger Sander, Renningen (DE); Dimitar Danev, Renningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/938,619

(22) Filed: Sep. 13, 2004

(65) Prior Publication Data

US 2005/0057057 A1    Mar. 17, 2005

(30) Foreign Application Priority Data

Sep. 12, 2003  (DE) ............................. 103 42 168

(51) Int. Cl.
    *B60J 7/00*    (2006.01)
(52) U.S. Cl. .................. 296/187.01; 362/544; 362/507
(58) Field of Classification Search ........... 296/187.01, 296/193.09, 203.02; 362/505, 506, 507
    See application file for complete search history.

(56) References Cited

U.S. PATENT DOCUMENTS

| | | | | |
|---|---|---|---|---|
| 5,394,310 A | * | 2/1995 | Iwasaki ..................... | 362/544 |
| 5,546,284 A | * | 8/1996 | Harada ...................... | 362/544 |
| 5,611,612 A | * | 3/1997 | Choji et al. ................ | 362/459 |
| 5,833,345 A | * | 11/1998 | Ito ............................. | 362/507 |
| 5,941,633 A | * | 8/1999 | Saito et al. ................. | 362/544 |
| 6,086,231 A | * | 7/2000 | Kenjo et al. ................ | 362/543 |
| 6,270,241 B1 | * | 8/2001 | Collot et al. ................ | 362/507 |
| 6,450,676 B1 | * | 9/2002 | Maeda et al. ............... | 362/549 |
| 6,547,427 B1 | * | 4/2003 | Cheron et al. .............. | 362/507 |
| 6,746,142 B1 | * | 6/2004 | Shirai ......................... | 362/524 |
| 6,793,359 B1 | * | 9/2004 | Iwamoto ..................... | 362/507 |
| 6,880,655 B1 | * | 4/2005 | Suwa et al. ................. | 296/193.1 |

(Continued)

FOREIGN PATENT DOCUMENTS

DE     30 44 313 C2    7/1984

(Continued)

*Primary Examiner*—Kiran B. Patel
(74) *Attorney, Agent, or Firm*—Crowell & Moring LLP

(57) ABSTRACT

A fastening device is provided for a component which is installed in a depression in an automotive body part, insertable into the depression from the outside via an inclined assembly position, and lockable in an operating position in the depression by a pivoting movement. In the operating position, a mounting part integrally molded on a first edge area of the component is in operative connection with a first side wall section of the depression, and, on an opposite second edge area of the component, an elastic catch part is provided, cooperating with a second side wall section of the depression. The depression also has two wall sections arranged with distance between them. To create the fastening device, with which the design is simplified and which also ensures rapid and simple installation and removal, a device is inserted between the depression and the adjacent component in the area of the two wall sections. The device ensures correctly positioned insertion of the component that is to be installed in the depression, and ensures a defined pivoting of the component about a pivot axis running approximately at a right angle to the wall sections, pivoting it into the operating position. The integrally molded mounting part engages behind a free edge area of the first side wall section when the component is pivoted, whereas the elastic catch part cooperates with a free edge area of the second wall section to form an engaged connection.

20 Claims, 7 Drawing Sheets

U.S. PATENT DOCUMENTS 6,905,236 B1 * 6/2005 Nishizawa et al. ......... 362/539

FOREIGN PATENT DOCUMENTS

| | | | |
|---|---|---|---|
| DE | 3402274 A1 | 8/1985 |
| DE | 3439234 C1 | 9/1986 |
| EP | 0 422 405 A1 | 4/1991 |
| EP | 1 024 075 A1 | 8/2000 |

* cited by examiner

FASTENING DEVICE FOR A COMPONENT INSTALLED IN A DEPRESSION IN AN AUTOMOTIVE BODY PART

This application claims the priority of German application 103 42 168.8, filed Sep. 12, 2003, the disclosure of which is expressly incorporated by reference herein.

BACKGROUND AND SUMMARY OF THE INVENTION

This invention relates to a fastening device for a component installed in a depression in an automotive body part, inserted into the depression from outside via an inclined assembly position, and shifted by a swiveling motion into an operating position within the depression. The fastening device includes a mounting part, integrally molded on a first edge area of the component, which, in the operating position, is in an operative connection with a first side wall section of the depression, and an elastic catch part, provided on an opposite second edge area, cooperating with a second side wall section of the depression. The depression includes third and fourth wall sections arranged with distance between them.

German Patent DE 30 44 313 C2 describes a fastening device approximately of this type with which catch parts, supporting parts and mounting parts are provided on the component. A swivel pin that forms the mounting part is integrally molded on a lateral edge area of the component and is inserted into an opening in the adjacent side wall section of the depression, the opening being lined with an elastic bush.

The fastening device also includes a separately fabricated V-shaped catch part attached to the component, whereby a catch hook of the catch part cooperates to form a connection to an opening in the side wall section of the depression. In addition, an S-shaped supporting part made of spring steel is provided on the back side of the component and is supported at its free end on the rear end of the depression under a prestress.

This arrangement has the disadvantage that the fastening device is formed by a plurality of parts which must be fastened to the component. Furthermore the insertion of the plug journal into the bush and/or opening in the side wall section is difficult because the opening is covered by the component as the component is brought into its proximity.

With this arrangement, the component may become uninstalled from the outside due to external pressure on the component, so it may happen that the connection is released and the component inadvertently falls out of the depression.

An object of this invention is to improve upon a fastening device such that the design of the fastening device is simplified and rapid and easy installation and removal are insured without requiring adjustment work.

This object is achieved according to this invention by providing a device which can be introduced between the depression and the component in an area of the third and fourth wall sections so as to ensure insertion of the component into the depression in a proper position and defined pivoting of the component about a pivot axis, which runs approximately at a right angle to the third and fourth wall sections, into the operating position, and, when the component is pivoted, by having the mounting part engage behind a free edge area of the first side wall section and the elastic catch part cooperate engagingly with a free edge area of the second side wall section. Additional features embodying this invention in an advantageous manner are claimed.

The main advantages achieved with this invention are that the component to be installed is inserted in the correct position due to the devices inserted in between in an upper region and a lower region between the depression and the adjacent component, and that swiveling of the component about a vertical swivel axis is achieved, thus permitting considerable time savings in assembly.

All parts of the fastening device are integrated into the body part and/or the component to be installed so that no additional fastening elements or parts (mounting frames, etc.) are needed. Only the two adjacent components need be coordinated mutually. This ensures easy installation and removal without requiring additional tools. The component can be removed by using a credit card or something similar which can be inserted into the gap between the component and the depression in the area of the catch part.

In dismantling, a safety lock is provided which is formed by the two-step design of the catch hook. Therefore, the component automatically springs forward and need not be pulled out of the depression but remains secured. The component remains in its operating position or returns to its operating position when a force is acting from the outside, e.g., by pendulum impact.

The component can be removed from the depression only by twice inserting a credit card or something similar.

The curved rear wall section has two openings adjacent to it laterally, and the housing of the component to be installed is designed to support insertion of the component in the correct position into the depression in the body part in the transverse direction.

One exemplary embodiment of this invention is explained in greater detail below.

DETAILED DESCRIPTION OF THE INVENTION

Figure 1:
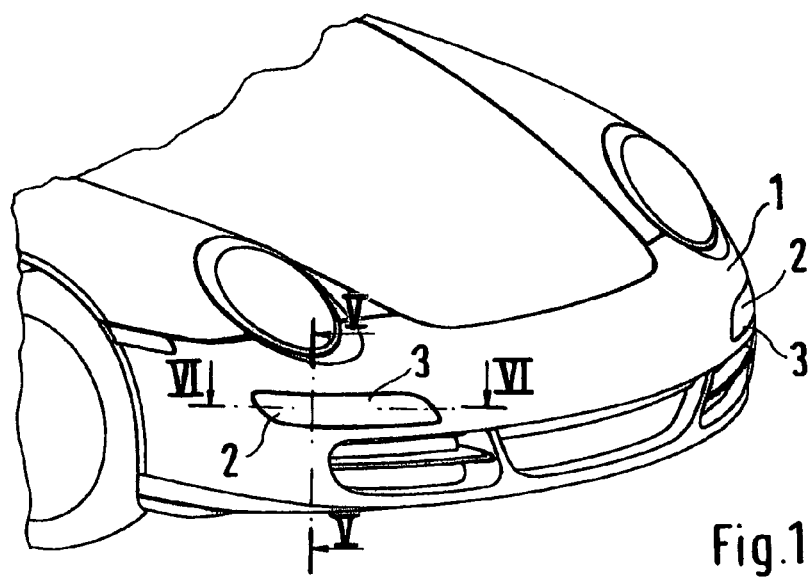
FIG. 1 is a perspective view obliquely from above of a front-end area of a passenger vehicle having a body part in which there is a depression for accommodating a component.
Figure 2:
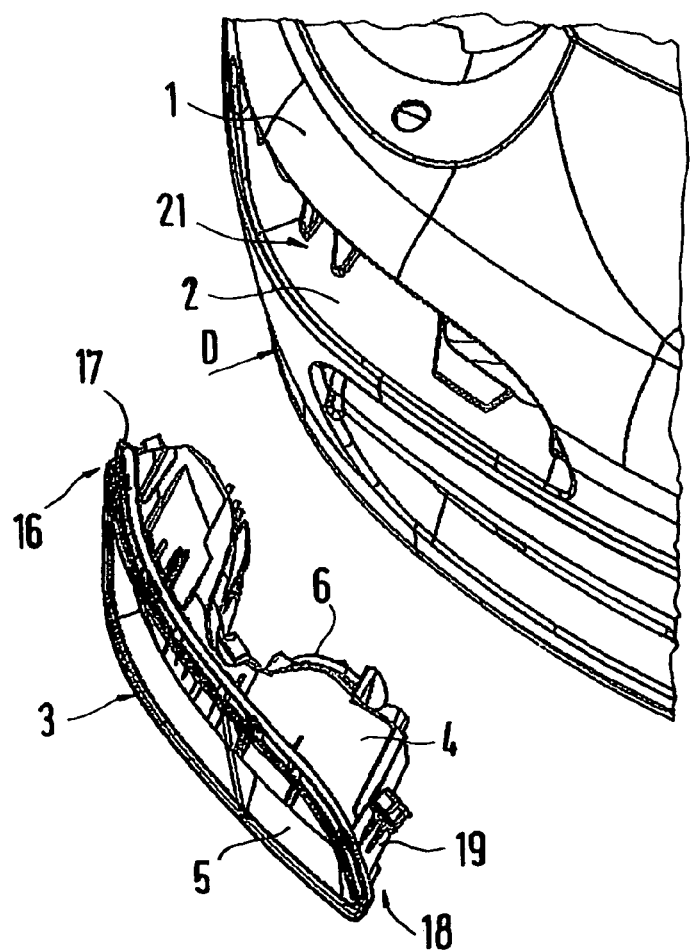
FIG. 2 is an exploded view of a partial region of the body part with the depression and the component insertable into the depression.
Figure 3:
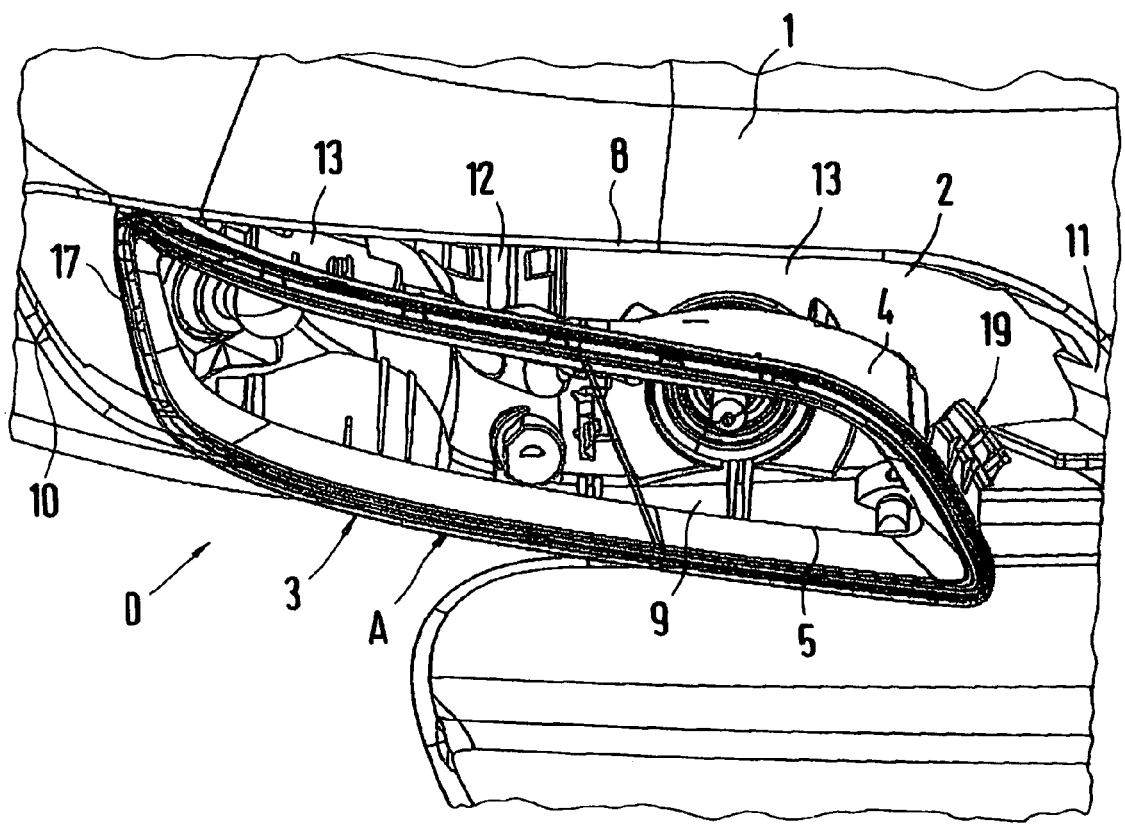
FIG. 3 shows obliquely from above a perspective view of the body part with the depression, where the component assumes an insertion position.
Figure 4:
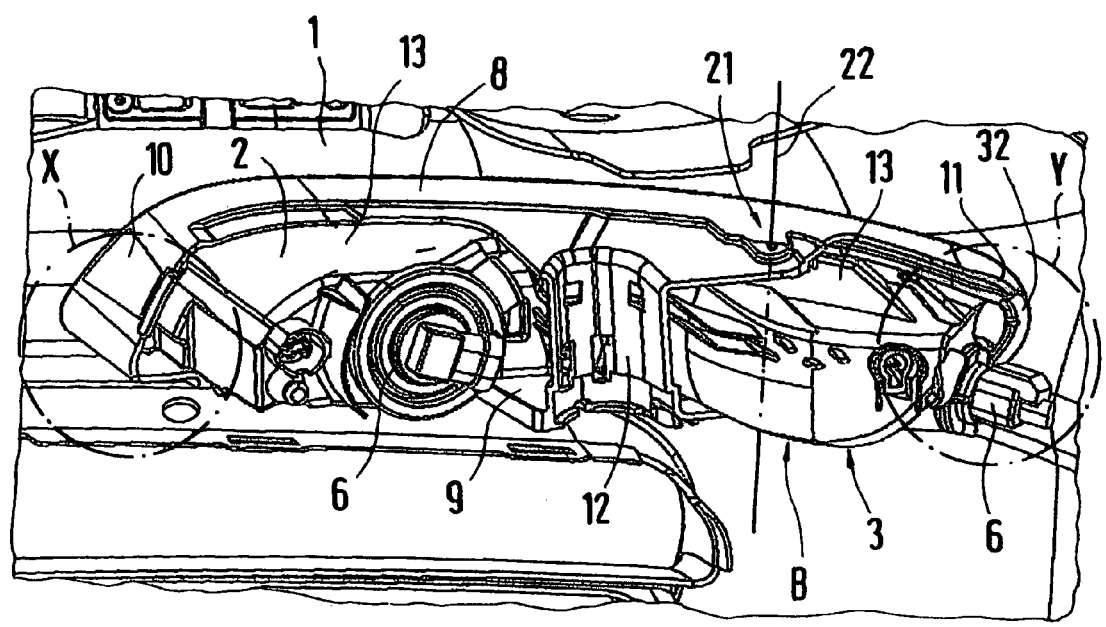
FIG. 4 is a view of the body part with the depression and the inserted component from the rear, where the component is assuming its operating position.
Figure 5:
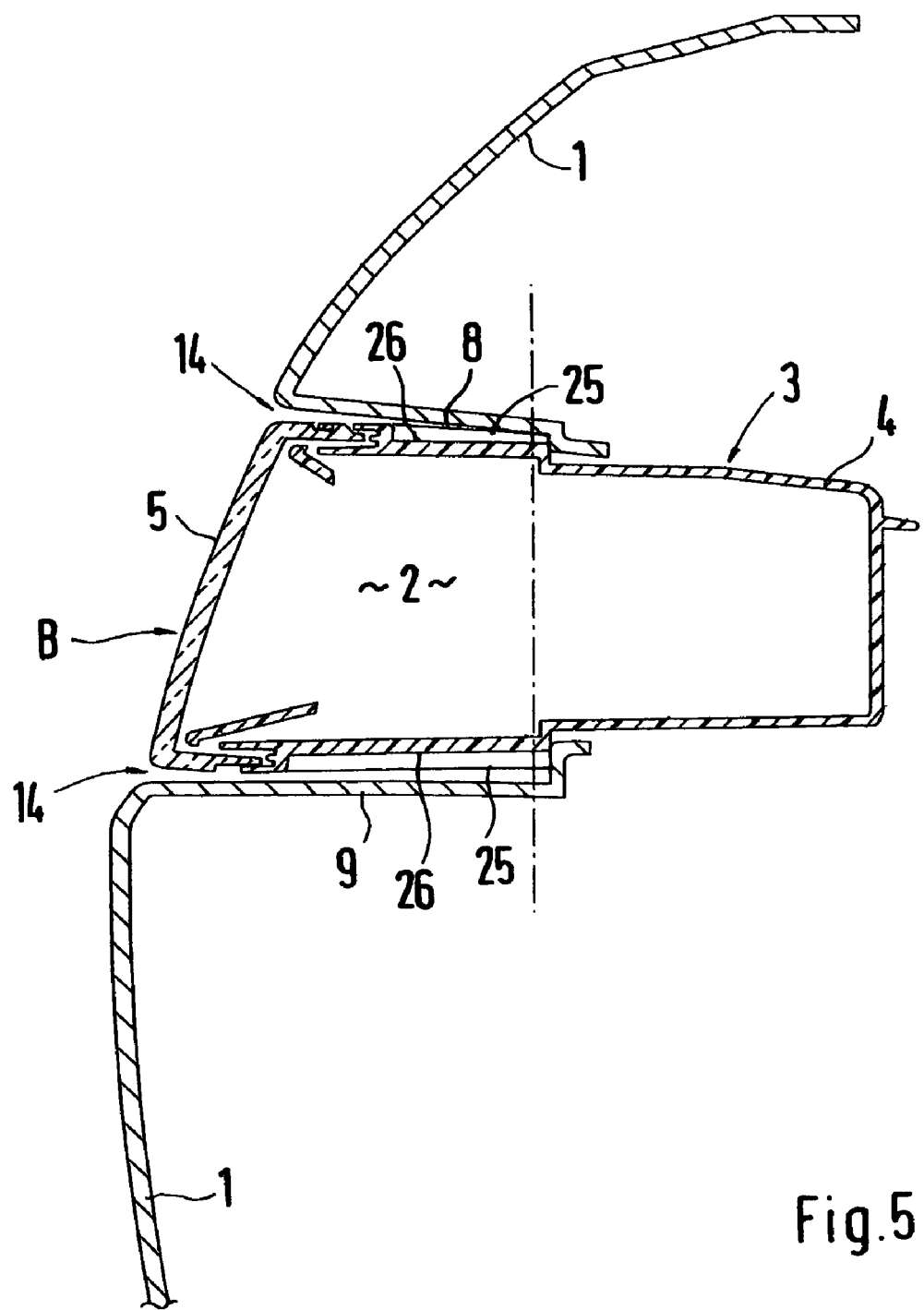
FIG. 5 shows the section according to line V—V in FIG. 1 in a larger view.
Figure 6:
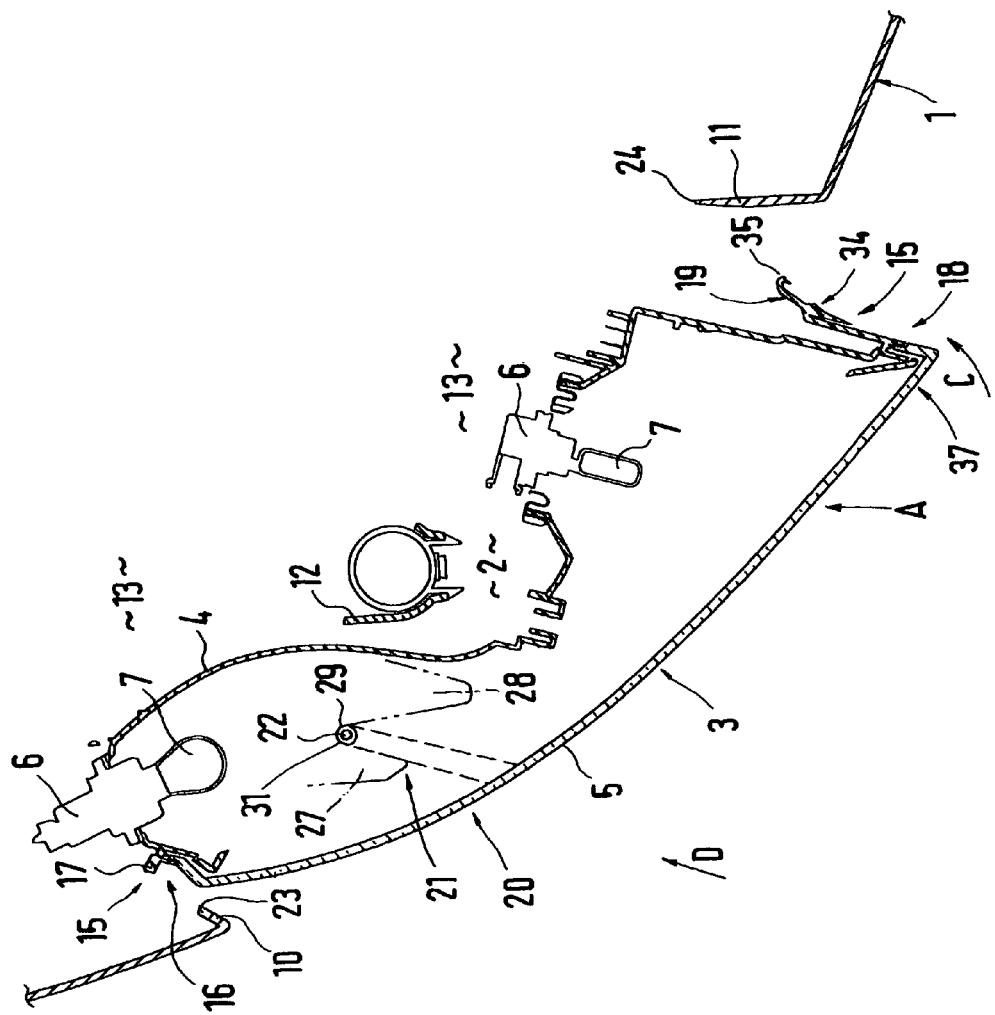
FIG. 6 shows the section according to line VI—VI in FIG. 1, where the component is in its insertion position.

FIG. 1 through FIG. 4 show an automotive body part 1, which has at least one depression 2 for accommodating a component 3. In the exemplary embodiment, the body part 1 is formed by a front-end part of a motor vehicle made of an elastic plastic. However, the body part 1 may also be formed by a sheet metal part or the like.

The component 3 in the exemplary embodiment is formed by an elongated extra light which is aligned approximately horizontally in the transverse direction of the vehicle, where the light has a flashing turn signal indicator and/or a position light and/or a fog light or the like. At least a partial region of the component 3 could be formed by an air intake part, a panel or the like, for example.

Component 3 consists essentially of a housing 4, which is closed on its front side by a transparent pane 5 of glass or plastic and which has lamp sockets 6 on its rear side into which incandescent lamps 7 can be inserted.

In this exemplary embodiment, the depression 2 is designed in one piece with the body part 1 and comprises an upper wall section 8, a lower wall section 9, two side wall sections 10, 11 arranged on opposite sides and a rear wall section 12 running vertically. In this exemplary embodiment, the upper wall section 8 and the lower wall section 9 are designed to be approximately horizontal. The rear wall section 12, which has a curved shape when seen from above, extends only in a central partial area of the transverse extent of the depression 2 and joins the upper wall section 8 to the lower wall section 9. This results in a stiffening of the depression 2. Large area openings 13, through which partial areas of the component 3 that is installed protrude, are provided on both sides of the rear wall section 12. Due to the shape of the rear wall section 12, the openings 13 and the corresponding design of the housing 4 of the component 3, insertion of the component 3 in the correct position in the depression 2 in the body part 1 in the transverse direction of the vehicle is facilitated. In the exemplary embodiment, the depression 2 running laterally is aligned approximately horizontally and the pivot axis 22 runs at a right angle thereto. The depression 2 may of course also run vertically or at an inclination.

The component 3 is brought to the depression 2 from the outside of the motor vehicle and is inserted into the depression 2 via an insertion position A running obliquely. For correct positioning of the component 3 in the vertical direction, ribs protruding locally are provided on the component 3, namely on the top and bottom sides of the housing 4, these ribs being supported at their free ends on corresponding supporting surfaces of the depression 2, which also protrude (not shown in detail here). Therefore, on insertion of the component 3, a uniform course of the joint 14 between the depression 2 and the component 3 is achieved all around.

The fastening device 15 for the component 3 installed in the depression 2 is made of a mounting part 17, which is integrally molded on a lateral edge area 16 of the component 3 and is in operative connection with a first side wall section 10 of the depression 2 in the operating position B of the component 3. Furthermore, the fastening device 15 includes an elastic catch part 19 which is situated on an opposing lateral edge area 18 of the component 3 and cooperates in the operating position B with a second side wall section 11 of the depression 2.

Figure 7:
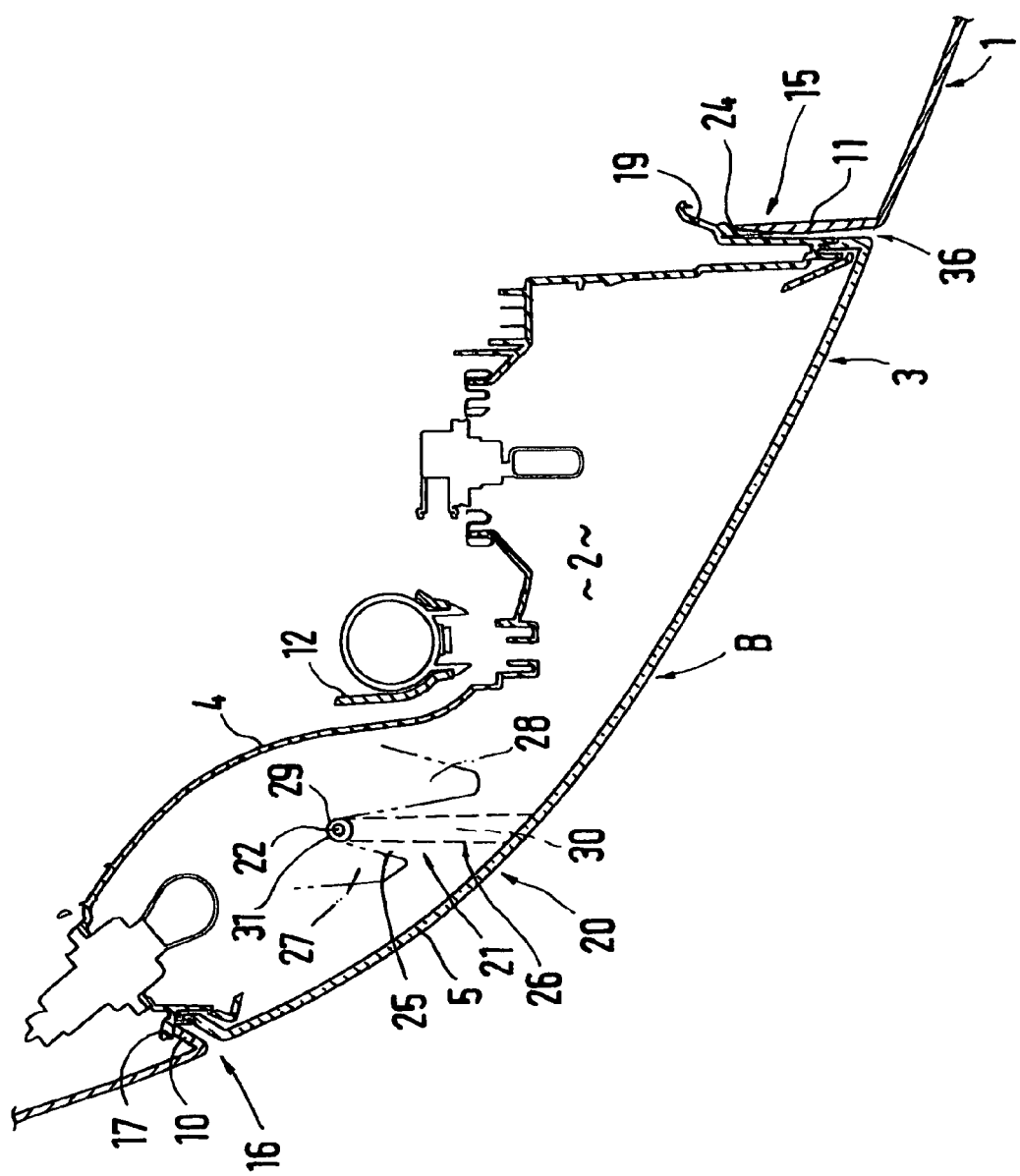
FIG. 7 shows a section corresponding to FIG. 6, but in the operating position of the component.
Figure 8:
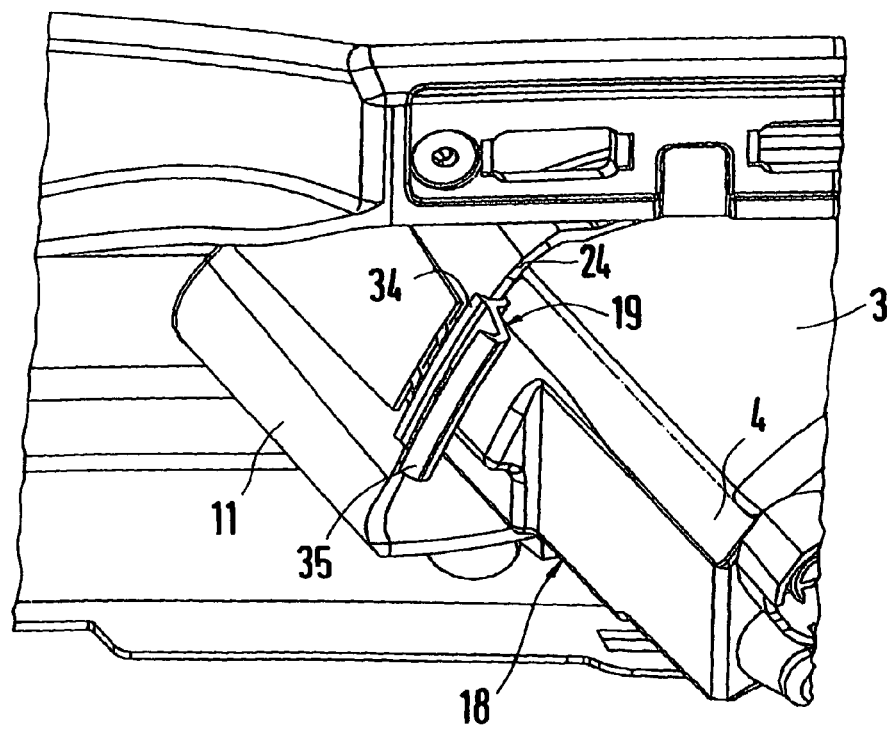
FIG. 8 shows a detail X from FIG. 4 in a larger view.

According to this invention, a device 21 is introduced between the depression 2 and the adjacent component 3 in an upper and/or a lower region 20, the device ensuring insertion of the component 3 that is to be installed in the depression 2 in the correct position and also facilitating a defined pivoting of the component 3 about an upright swivel axis 22 into the operating position B. When the component 3 is pivoted in the direction of arrow C about the pivot axis 22; the integrally molded mounting part 17 engages behind a free edge area 23 of the first side wall section 10, whereas the elastic catch part 19 cooperates with a free edge area 24 of the second side wall section 11 to form an engaged connection (FIG. 7).

Each device 21 is composed of a receptacle 25 which is open in the direction of insertion D of the component 3 and a guide element 26 which cooperates with the receptacle 25. In the exemplary embodiment, the receptacles 25 are allocated to the body part 1 and the guide elements 26 are allocated to the component 3. Of course a kinematic inversion of this principle could also be provided.

The receptacles 25 are preferably designed in one piece with the body part. However, they could also be formed by separate parts which are subsequently attached to the body part 1.

The guide elements 26 are preferably designed in one piece with the component 3 accommodating them. The mounting part 17 and the elastic catch part 19 are also designed in one piece with the component 3 to be installed and are formed by integrally molded sections of the housing 4. The receptacles 25 which are preferably provided on the upper wall section 8 and on the lower wall section 9 are each designed to be approximately V shaped as seen from above, with the two lateral legs 27, 28 of each receptacle 25 being joined together by a rear radius-like transitional area 29. Due to the V-shaped design of the receptacle 25 the insertion of the component 3 into the depression 2 is greatly facilitated and is accomplished necessarily.

The guide elements 26 which are formed on the housing 4 of the component 3 and protrude downward and/or upward are formed by cylindrical rotary pins (not shown in detail) or by elongated rib-like moldings 30 which are designed as circles or semicircles as seen from above on their ends which face the receptacles 25. In the assembly of the component 3, it is inserted into the depression 2 until the circular or semicircular ends 31 or the cylindrical rotary journals are in contact with the radius-shaped transitional area 29 of the receptacles 25. The midpoints of the cylindrical rotary journals situated one above the other in the height direction and/or the midpoints of the semicircular ends of the guide elements 26 as well as of the receptacles 25 define the pivot axis 22 of the component 3.

As seen from above, the pivot axis 22 of the component 3 runs at a distance from the two side wall sections 10, 11 of the depression 2, namely adjacent to the rear vertical wall section 12 of the depression 2.

Figure 9:
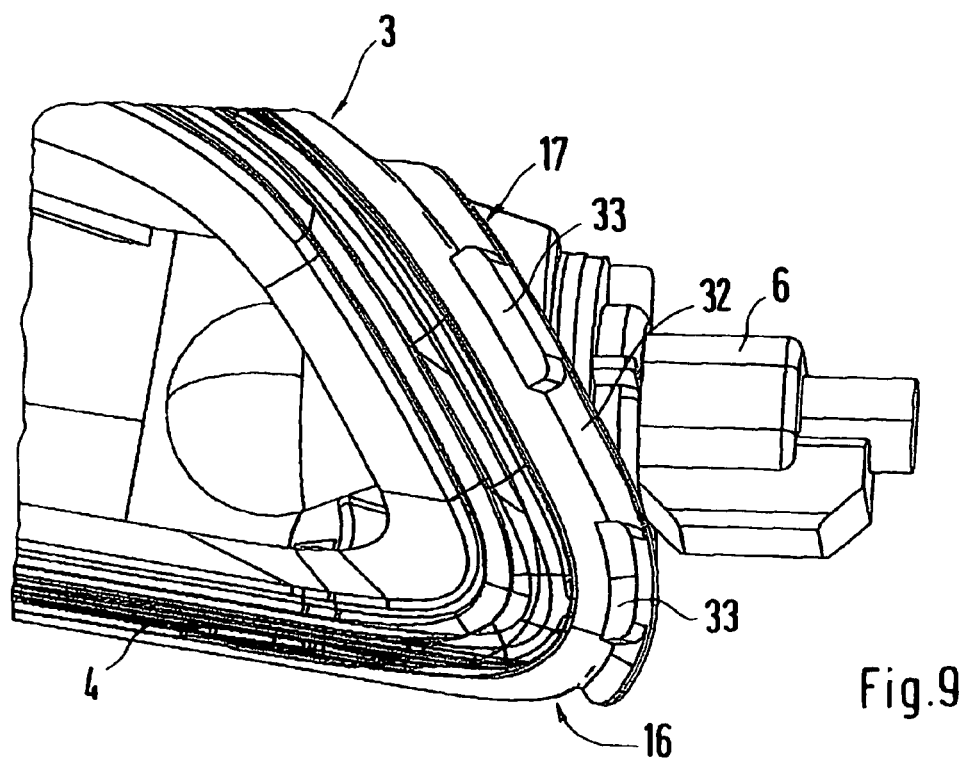
FIG. 9 shows a detail Y from FIG. 4 in a larger view.

The mounting part 17 is formed by an integrally molded elongated narrow flange 32 which is adapted to the three-dimensional shape of the adjacent curved side wall section 10. The mounting part 17 may be in contact with elevated supporting sections 33 on the end wall area 23 of the side wall section 10 over its entire longitudinal extent or just in some areas (FIG. 9). The elastic catch part 19 in the exemplary embodiment comprises two catch hooks 34, 35 which are placed opposite one another in the direction of insertion D. In the operating position B of the component 3, the catch hook 34, which is farther toward the front, engages behind the edge area 24 of the side wall section 11 of the depression 2 (FIG. 7).

The catch hook 35, which is farther toward the rear in the direction of insertion D, represents an additional security to prevent unwanted loss of component 3 if the catch connection between the catch hook 34 and edge area 24 has been released. The catch connection can be released by means of a credit card or something similar without the use of additional tools, by simply inserting the credit card or the like from the outside into the gap 36 between the component 3 and the depression 2 in the area of the catch part 19.

The component 3 is installed by bringing the component 3 from the front up to the depression 2 of the body part 1 in a slightly inclined position. Insertion of the component 3 in the transverse direction in the proper position is defined by the contour of the rear wall section 12 of the depression 2, the two openings 13 laterally adjacent thereto and the correspondingly designed housing 4 of the component 3 that is to be installed.

At the same time the guide elements 26 of the component 3 engage in the V-shaped receptacles 25 of the depression 2 which are open toward the front. The component 3 is moved in the direction of insertion D until the rotating journal or the arc-shaped ends 31 of the guide elements 26 rest at the base of the receptacle 25. Then by pressing briefly on the inner end 37 of the component 3, it is pivoted about the vertical pivot axis 22 of the device 21. Simultaneously with the pivoting, the component 3 is engaged at both lateral end areas.

The component 3 is uninstalled by twice inserting a credit card or the like into the gap 36 between the component 3 and the depression 2 namely in the area of the catch part 19. Then the component 3 can be removed from the depression 2. The first time the credit card is inserted, the connection between the front catch hook 34 and the edge area 24 of the side wall section 11 is released and the component 3 springs slightly toward the outside but is prevented from falling out by the second catch hook 35.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A fastening device for a component adapted to be installed in a depression in an automotive body part and inserted into the depression from outside via an inclined assembly position and shifted by a swiveling motion into an operating position within the depression, comprising:
    a mounting part, integrally molded on a first edge area of the component, which, in the operating position, is in an operative connection with a first side wall section of the depression, and
    an elastic catch part, provided on an opposite second edge area, cooperating with a second side wall section of the depression,
    wherein the depression includes third and fourth wall sections arranged with distance between them,
    wherein a device can be introduced between the depression and the component in an area of the third and fourth wall sections so as to ensure insertion of the component into the depression in a proper position and defined pivoting of the component about a pivot axis, which runs approximately at a right angle to the third and fourth wall sections, into the operating position, and
    wherein, when the component is pivoted, the mounting part engages behind a free edge area of the first side wall section and the elastic catch part cooperates engagingly with a free edge area of the second side wall section.

2. The fastening device as claimed in claim 1, wherein each device which can be introduced is composed of a receptacle which is open in a direction of insertion of the component and a guide element which cooperates with the receptacle.

3. The fastening device as claimed in claim 2, wherein the receptacle is assigned to the body part and the guide element is assigned to the component.

4. The fastening device as claimed in claim 2, wherein the receptacle is assigned to the component and the guide element is assigned to the body part.

5. The fastening device as claimed in claim 2, wherein the receptacle is designed in one piece with the body part.

6. The fastening device as claimed in claim 3, wherein the receptacle is designed in one piece with the body part.

7. The fastening device as claimed in claim 4, wherein the receptacle is designed in one piece with the body part.

8. The fastening device as claimed in claim 2, wherein each guide element is designed in one piece with the component.

9. The fastening device as claimed in claim 3, wherein each guide element is designed in one piece with the component.

10. The fastening device as claimed in claim 4, wherein each guide element is designed in one piece with the component.

11. The fastening device as claimed in claim 1, wherein the mounting part and the elastic catch part are designed in one piece with the component that is to be installed.

12. The fastening device as claimed in claim 2, wherein the receptacle is designed approximately in a V shape as seen from above, with two legs of the receptacle being joined together by a rear transitional area.

13. The fastening device as claimed in claim 12, wherein the transitional area has a radius.

14. The fastening element as claimed in claim 2, wherein the guide element is a protruding guide element formed by at least one cylindrical rotating journal or elongated rib-like molding designed as a semicircle as seen from above on its end which faces the receptacle.

15. The fastening device as claimed in claim 1, wherein the mounting part is formed by an elongated flange which is adapted to the spatial shape of the second side wall section.

16. The fastening device as claimed in claim 1, wherein the elastic catch part comprises two catch hooks which are set against one another in a direction of insertion, a front catch hook of said two catch hooks, in the direction of insertion, defining the operating position, and a rear catch hook of said two catch hooks, in the direction of insertion, representing a security against the component unintentionally falling out.

17. The fastening device as claimed in claim 1, wherein, for positioning the component in the correct position, ribs are provided that protrude locally in a height direction on the component, and locally corresponding supporting surfaces are formed on the depression, so that the ribs are supported with their free ends on the supporting surfaces.

18. The fastening device as claimed in claim 1, wherein the pivot axis runs at a distance from the first and second side wall sections of the depression as seen from above.

19. The fastening device as claimed in claim 2, wherein the mounting part is formed by an elongated flange which is adapted to the spatial shape of the second side wall section.

20. The fastening device as claimed in claim 2, wherein the elastic catch part comprises two catch hooks which are set against one another in a direction of insertion, a front catch hook of said two catch hooks, in the direction of insertion, defining the operating position, and a rear catch hook of said two catch hooks, in the direction of insertion, representing a security against the component unintentionally falling out.

* * * * *